(12) United States Patent
Shimomura

(10) Patent No.: US 6,973,861 B2
(45) Date of Patent: Dec. 13, 2005

(54) LATHE-CUTTING APPARATUS FOR CRANKSHAFT AND LATHE-CUTTING METHOD THEREOF

(75) Inventor: Masumi Shimomura, Komatsu (JP)

(73) Assignee: Komatsu Machinery Corporation Ltd., Komatsu (JP)

( * ) Notice: Subject to any disclaimer, the term of this patent is extended or adjusted under 35 U.S.C. 154(b) by 219 days.

(21) Appl. No.: 10/334,238

(22) Filed: Dec. 31, 2002

(65) Prior Publication Data

US 2003/0150302 A1    Aug. 14, 2003

(30) Foreign Application Priority Data

Feb. 6, 2002  (JP) .............................. 2002-029575

(51) Int. Cl.[7] ............................................... B23B 5/18
(52) U.S. Cl. .......................................... 82/106; 82/108
(58) Field of Search ........................ 82/1.11, 106, 108; 29/6.01; 409/132

(56) References Cited

U.S. PATENT DOCUMENTS

| | | | | |
|---|---|---|---|---|
| 6,071,049 A | * | 6/2000 | Janssen | ...................... 409/132 |
| 6,322,300 B1 | * | 11/2001 | Santorius et al. | ........... 409/199 |
| 6,506,004 B1 | * | 1/2003 | Kohlhase et al. | ........... 409/131 |
| 6,672,184 B2 | * | 1/2004 | Ogawa et al. | ................. 82/106 |
| 6,684,500 B1 | | 2/2004 | Kohlhase et al. | |

FOREIGN PATENT DOCUMENTS

| | | |
|---|---|---|
| DE | 218886 | 2/1910 |
| DE | 197 49 939 C2 | 5/1999 |
| JP | 8-25103 A | 1/1996 |
| JP | 2589971 B2 | 12/1996 |
| JP | 11-90717 A | 4/1999 |

* cited by examiner

Primary Examiner—Willmon Fridie, Jr.
(74) Attorney, Agent, or Firm—Frishauf, Holtz, Goodman & Chick, P.C.

(57) ABSTRACT

A lathe-cutting apparatus and a method with a structure of a chuck being simple, which are capable of lathe-cutting an eccentric part of a crankshaft with high accuracy are provided. For this purpose, the apparatus includes a supporting device (21) for supporting both end portions of a crankshaft (1), a rotational drive device (20) for rotating the crankshaft from at least one end side of the supporting device with a main journal (3) of the crankshaft as a center, and rotationally driving an eccentric part (2), a tool (31) for performing lathe-cutting of the eccentric part, and a cutting tool drive unit (30) for making a cutting edge position of the tool perform crank rotation synchronously with the rotation of the eccentric part which is rotationally driven by the rotational drive device, and performing lathe-cutting of the eccentric part.

4 Claims, 5 Drawing Sheets

LATHE-CUTTING APPARATUS FOR CRANKSHAFT AND LATHE-CUTTING METHOD THEREOF

TECHNICAL FIELD

The present invention relates to a lathe-cutting apparatus and a lathe-cutting method for performing lathe-cutting of an eccentric part of a crankshaft.

BACKGROUND ART

In cutting work of a pin journal that is an eccentric part of a crankshaft, so-called lathe-turning work in which a pin journal of the crankshaft is rotated with its axis and a main shaft center of a working device being matched and lathe-cutting is performed with a cutting tool, and milling work by means of a crankshaft miller are conventionally adopted generally. As a lathe-cutting machine of the former, which performs lathe-cutting, for example, a lathe-cutting machine for a crankshaft disclosed in Japanese Patent No. 2589971 is known, and this will be explained with reference to FIG. 9. FIG. 9 is a view in which an installment state of the crankshaft is added to an explanatory view of a chuck device of the crankshaft lathe-cutting machine described in the same Patent.

At both end portions of the above-described lathe-cutting machine, it has a chuck 142 which supports a crankshaft 100, rotationally drives a pin journal 102, and performs phase determination of rotational angle of the pin journal 102. A main operation of the chuck will be explained. Main journal parts at both ends of the crankshaft 100 are supported by chuck centers 175 and ternary claws 159, which are provided at the left and the right chucks 142. A shaft center A of the pin journal 102 to be worked and a center B of a main shaft 103 of the lathe-cutting machine are matched, and they are rotated around the axis of the pin journal 102 by a rotational drive device (not shown) at the rear of the main shaft 103. Lathe-cutting of the pin journal 102 is performed by means of a tool (not shown) provided at a tool stand (not shown) movable in an axial direction and a shaft diameter direction of the pin journal 102.

The crankshaft 100 shown in the drawing is an example for a four-cylinder engine. In this case, after a pin journal 102a is worked, setup change (so-called pin journal rotational angle phase indexing) to match a shaft center D of a pin journal 102b to the center B of the main shaft 103 is necessary to work the pin journal 102b different in phase by 180 degrees from the pin journal 102a. The pin journal rotational angle phase indexing is performed by releasing or fastening a coupling 144 by an indexing cylinder 147 with the crankshaft 100 being chucked by the ternary claw 159. The crankshaft 100 is rotated 180 degrees around a shaft center C of the crank shaft 100 with the chuck 142 by the rotational drive device (not shown) at the rear of a chuck drive shaft 105 via the chuck drive shaft 105 and a double link joint 141, and the rotational angle phase is indexed, whereby the pin journal rotational angle phase indexing is carried out.

Next, in the crankshaft working, it frequently happens that crankshafts differing only by a half stroke are fed to the same working machine at random, and therefore it is demanded to perform setup change by a half stroke quickly. A half stroke is the distance between the shaft center A of the pin journal 102 and the shaft center C of the crankshaft 100. The half stroke setup change is constituted to be performed by moving a slide 119, which is fixed to the chuck 142 by a predetermined half stroke by a hydraulic cylinder (not shown) with respect to the main shaft 103 on a plane including the shaft center A of the pin journal 102 and the shaft center C of the crankshaft 100.

However, by this half stroke conversion, the chuck 142 and the crankshaft 100 are away from and close to the center B of the main shaft 103, and unbalance amount of rotation around the center B of the main shaft 103 is increased and decreased, and is not fixed. To eliminate the unbalance amount, a balance weight 131 is provided in this machine, and this is structured to be interlocked with a moving amount corresponding to the half stroke conversion of the above-described slide 119 by the drive device (not shown) and moved in the opposite direction to the movement of the above-described slide 119.

As an example of a prior art of milling work by a crankshaft miller of the latter, there are many examples described in Japanese Patent Laid-open No. 8-25103, Japanese Patent Laid-open No. 11-90717 and the like. Each of them is a method of working an eccentric part (for example, a pin journal) of a crankshaft into a predetermined shape by milling work in which a cutting edge of a rotated milling cutter is moved in a predetermined locus within a plane perpendicular to an axis of an eccentric part of a crankshaft being a part to be worked However, the prior art of the lathe-cutting machine for the crankshaft described in Japanese Patent No. 2589971 has the following problems.

(1) Since the crankshaft 100 is not rotated around the axis of the main journal, but it is rotated around the axis of the pin journal eccentric from the axis of the main journal, a large unbalance amount occurs not only to the crankshaft itself but also to the chuck 142 which supports the crankshaft. The unbalance amount changes at the time of half stroke conversion, but even if a cancel mechanism for the unbalance amount is provided, it is substantially impossible to eliminate the unbalance amount to an extent without a problem in practical use when the rotational frequency of the shaft is increased. From the above-described reason, an influence of rotation unbalance is exerted at the time of working, and harmful work displacement at the time of rotation and vibration and the like of the work or a mechanical system occur, thus making it impossible to obtain favorable working accuracy.

(2) When an extra-long shaft work such as a crankshaft is rotated and worked, it is absolutely necessary to increase flexural rigidity of the work against cutting load by performing auxiliary support (so-called rest) the shaft region at least at one spot having the same center of rotation as the region to be worked, in the vicinity of substantially the center in the axial direction, in addition to supporting of the work at its both ends to make heavy cutting possible or to obtain favorable finishing work accuracy. However, in the prior art, the crankshaft is rotated around the axis of the pin journal, and therefore there is no shaft portion which shares the center of rotation near the region to be worked, thus making it impossible to perform auxiliary support (rest) for it. Consequently, heavy cutting is difficult, and favorable finishing work accuracy cannot be expected.

(3) In the prior art, as described above, it is necessary to perform half stroke conversion, pin journal rotation angle phase indexing, cancel of the unbalance amount and the like inside the chuck, and therefore the structure of the chuck becomes very complicated, and expensive. Since the structure of the chuck is extremely complicated, there arises the problem that a trouble is easily caused, or the service life is short. Further, a number of hydraulic actuators are included in the chuck, and many hydraulic rotary joints are needed at a conduit line to supply oil to them, thus causing a fear of trouble of oil leakage occurring to seal regions of these hydraulic rotary joints.

Each of the prior arts in Japanese Patent Laid-open No. 8-25103, Japanese Patent Laid-open No. 11-90717 and the like adopts a method of milling the eccentric part (for example, the pin journal) of the crankshaft by moving the cutting edge of the rotated milling cutter in a predetermined locus from a diameter direction outside the shaft portion to be worked toward the shaft center, in a plane perpendicular to the axis of the eccentric part of the crankshaft that is the region to be worked. In this situation, a shoulder surface of the shaft portion to be worked is worked with the cutting edges of tips projected in a width direction of the cutter. However, since the cutter is rotating, in a corner portion at which the shoulder surface (journal side surface) and the shaft outer diameter surface intersect, it is impossible to work a so-called undercut groove, which is recessed in the axial direction, even if the cutter is moved in the axial direction. The crank shaft has many cases requiring i) grinding undercut at both ends in a width direction of the pin journal, or ii) a groove which is (undercut) recessed in the axial direction when R groove working is performed as pre-finishing of deep roll. However, for the above-described reason, the undercut groove working cannot be performed with working by means of the milling cutters, and it becomes necessary to add a lathe-cutting process step by a separate machine from the crankshaft miller.

SUMMARY OF THE INVENTION

The present invention is made in view of the above-described problems, and has its object to provide a lathe-cutting apparatus for a crankshaft and a lathe-cutting method thereof with a structure of a chuck being simple, which can perform lathe-cutting of an eccentric part of a crankshaft with high accuracy without being influenced by rotation balance of a work.

In order to attain the above-described object, a first aspect of a lathe-cutting apparatus for a crankshaft according to the present invention is a lathe-cutting apparatus which performs lathe-cutting of an eccentric part of a crankshaft, and includes supporting devices which support both end portions of the crankshaft, rotational drive devices which rotate the crankshaft from at least one end side of the supporting devices with a main journal of the crankshaft as a center, and rotationally drive the eccentric part, tools which perform lathe-cutting of the eccentric part, and cutting tool drive units which make cutting edge positions of the tools perform crank rotation synchronously with the rotation of the eccentric part which is rotationally driven by the rotational drive devices to perform lathe-cutting of the eccentric part.

According to the first constitution, the crankshaft is rotated with the axis of the main journal as the center, and therefore, not to mention that the rotation unbalance amount of the crankshaft itself does not exist, the chuck supporting this has a simple structure, thus making it possible to extremely reduce the occurrence of the unbalance amount to the chuck during rotation. Accordingly, during working, a trouble, in which harmful work displacement during rotation, vibrations and the like of the work or the mechanical system occur and favorable working accuracy cannot be obtained, does not occur. When an extra-long shaft object is rotated and worked, in order to make heavy cutting possible, or to obtain favorable finishing work accuracy, it is extremely effective to increase flexural rigidity of the work against the cutting load by performing auxiliary support (rest) of a shaft region having the same center of rotation at least at one spot, in the vicinity of the center in an axial direction, in addition to supporting of the work at its both ends. According to the present invention, since the crankshaft is rotated with the axis of the main journal as the center, auxiliary support (rest) of any of the main journal outer diameter portions sharing the center of rotation and located in the vicinity of the longitudinal center of the work can be performed. Consequently, heavy cutting is made possible and favorable finishing work accuracy can be expected.

In addition, according to the first constitution of the present invention, it is not necessary to perform half stroke conversion, pin journal phase indexing, automatic cancel of an unbalance amount, and the like inside the chuck, thus extremely simplifying the structure of the chuck, and the production cost becomes low. The chuck dose not need the other functions than the clamp function, the number of components such as actuators included therein is small, and the structure is very simple, thus extremely reducing troubles, and making it possible to increase the useful life. In addition, the number of the conduit lines to supply oil to the hydraulic actuators becomes small, thus reducing the hydraulic rotation joints, and eliminating the fear of oil leakage from the seal regions.

A second aspect of a lathe-cutting apparatus of a crankshaft according to the present invention is a lathe-cutting apparatus which performs lathe-cutting of an eccentric part of a crankshaft, and includes supporting devices which support both end portions of the crankshaft, rotational drive devices which rotate the crankshaft from at least one end side of the supporting devices with a main journal of the crankshaft as a center, and rotationally drive the eccentric part, tools which perform lathe-cutting of the eccentric part, two cutting tool driving main shafts each having an axis parallel with an axial direction of the crankshaft, eccentric pins which are provided to be protruded by the same eccentricity amount on the end surfaces of the cutting tool driving main shafts, tool stands each including the tool at a tip end portion thereof, and including two eccentric pin bearings for fitting the eccentric pins which are provided with the same space between them as the space between the axes of the two cutting tool driving main shafts, driving devices which rotationally drive at least any one shaft of the two cutting tool driving main shafts, and synchronization means for synchronizing crank rotation of the cutting edge positions of the tools via the tool stands by the driving devices with rotation of the eccentric part with the main journal as the center.

According to the above second constitution, the constitution is simple by including the tools, each of the two cutting tool driving main shafts provided in parallel with the axial direction of the crankshaft, the eccentric pins which are attached to the end surfaces by the same eccentricity amount, and the tool stands which are attached to the eccentric pins and mounted with the tools. According to the constitution, in addition to the effects of the above-described first constitution, the effect of making it possible to perform crank rotation of the cutting edge position of the tool accurately is provided.

Further, in the lathe-cutting apparatus for the crankshaft, the cutting tool drive unit, which makes the cutting edge position of the tool perform crank rotation synchronously with the rotation of the eccentric part to perform the lathe-cutting of the eccentric part, may be made movable in at least any one direction of an axial direction of the crankshaft and a direction perpendicular to the axis. According to this constitution, the cutting tool drive unit is constituted to be movable in any one direction of the axial direction (Z-axis direction) of the work and the direction perpendicular to the axis (X-axis direction). Consequently, it becomes possible to perform grinding undercut working in the corner portion at which the shoulder surface (side surface) of the eccentric part of the crankshaft and the shaft outer diameter surface are intersecting, which cannot be worked with the conventional crankshaft miller, or working of the R groove recessed in the axial direction, which is required as the pre-working of the deep roll.

In the lathe-cutting apparatus for the crankshaft, eccentricity amount adjusting means, which set an eccentricity amount from the cutting edge position of the tool to the center of the cutting tool drive main shafts by conforming it to a half stroke of the crankshaft, may be included. According to this constitution, the eccentricity amount from the cutting edge position of the tool to the center of the cutting tool driving main shafts of the cutting tool drive unit can be set correspondingly to a half stroke of each crankshaft by the eccentricity amount adjusting means, and working of various crankshafts with difference by a half stroke is possible.

In the lathe-cutting apparatus for the crankshaft, the eccentricity amount adjusting means may comprise advancing and retreating means which is moved in an axial direction from behind the cutting tool driving main shafts with an actuator, and pin moving means which converts a thrust force in an axial direction, of the cutting tool driving main shafts into a direction perpendicular to the axis at an end surface side of the cutting tool driving main shafts to move the eccentric pins in an eccentricity amount adjusting direction. According to this constitution, the eccentricity amount can be automatically adjusted, and in the crankshaft working line, it becomes possible to perform working operation by feeding various crankshafts differing by a half stroke at random, and therefore productivity of the working line can be improved. Further, since the actuator which moves the eccentric pin in the eccentricity adjusting direction is not provided inside the driving system which performs driving of crank rotation of the tool stand, but it is provided behind the cutting tool driving main shafts, and therefore the weight of the actuator does not becomes the factor of unbalance, thus making it possible to perform crank rotation drive of the tool stand smoothly.

Further in the lathe-cutting apparatus for the crankshaft, the eccentricity amount adjusting means may be eccentricity amount changing means which is provided between the end surfaces of the cutting tool driving main shafts and rear parts of the eccentric pins, and manually performs a plurality of positionings of the eccentric pins in a eccentricity amount adjusting direction by a setup change. According to this constitution, the eccentricity amount adjusting means is constituted to perform position setting of the eccentric pin in the eccentricity amount adjusting direction manually, and therefore the structure of the apparatus is simple and compact, in addition to which, it is possible to produce it at low cost.

A first aspect of a lathe-cutting method according to the present invention is a lathe-cutting method of performing lathe-cutting of an eccentric part of a crankshaft, and includes the steps of: on performing lathe-cutting of the eccentric part, supporting both end portions of the crankshaft, and rotating the crankshaft with a main journal as a center from at least one end side of the both end portions, and making a cutting edge position of a tool perform crank rotation synchronously with the rotation of the eccentric part with the main journal as the center. According to this first method, the same effects as in the fist constitution of the above-described apparatus can be obtained.

A second aspect of the lathe-cutting method for the crankshaft according to the present invention is a lathe-cutting method of performing lathe-cutting of an eccentric part of a crankshaft, and includes the steps of: on performing lathe-cutting of the eccentric part, supporting both end portions of the crankshaft; rotating the crankshaft from at least one end side of the both end portions with a main journal as a center; and rotating two cutting tool driving main shafts which are provided in parallel with an axial direction of the crankshaft synchronously with the rotation of the eccentric part with the main journal as the center, and rotationally driving a tool stand via respective eccentric pins which are provided at one end surfaces of the cutting tool driving main shafts, thereby making a cutting edge position of the tool provided at the tool stand perform crank rotation synchronously with the rotation of the eccentric part. According to the second method, the same effects as in the second constitution of the above-described apparatus can be obtained.

BEST MODE FOR CARRYING OUT THE INVENTION

Preferred embodiments of the present invention will be explained below with reference to the drawings. First, based on FIG. 1 to FIG. 7, a first embodiment will be explained.

Figure 1:
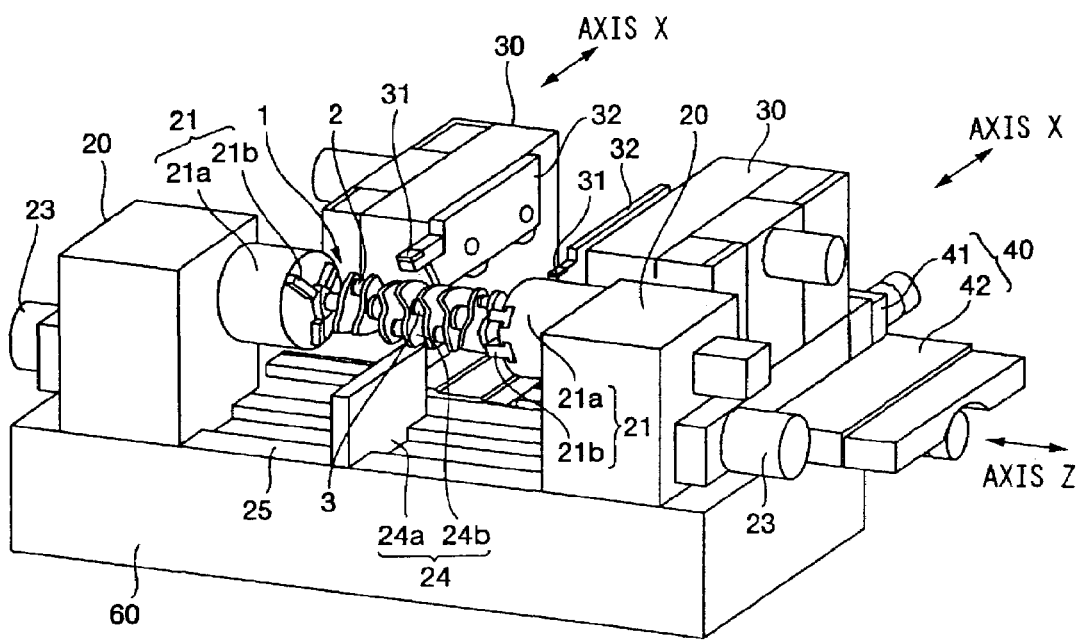
FIG. 1 is a perspective view of a crankshaft lathe-cutting machine according to the present invention.

Based on FIG. 1, an outline of a crankshaft lathe-cutting machine according to the present invention will be explained. Two rotational drive devices 20 and 20, which support both end portions of a crankshaft 1 to be worked (hereinafter, called a work 1) and rotationally drive it by rotational drive motors 23 and 23, are provided at both left and right end portions at a front face on a bed 60. Supporting devices 21 and 21 having chuck ternary claws 21b and 21b and chucks 21a and 21a to support the both end portions of the work 1 are respectively provided on surfaces of both rotational drive devices 20 and 20, which oppose each other. The two rotational drive devices 20 and 20 are provided movably along a rail 25 which is provided on the bed 60 in the left and right direction in the drawing to conform a space between both the supporting devices 21 and 21 to length of the work 1.

An auxiliary supporter 24 is provided between both the supporting devices 21 and 21. The auxiliary supporter 24 includes an auxiliary supporter main body 24a, which is provided to be able to be positioned at a position of a main journal 3 in the vicinity of a center portion of the work 1, and a auxiliary supporter claw 24b, which is equipped at an upper part of the auxiliary supporter main body 24a and performs auxiliary support for the main journal 3 in the vicinity of the center portion of the work 1 by means of a centripetal clamp (not shown). Two cutting tool drive units 30 and 30 on the left and the right are placed behind both the supporting devices 21 and 21 and the work 1. Two of the cutting tool drive units 30 and 30 are respectively mounted on saddles 40 and 40 having Z-axis slides 42 and 42 movable in the axial direction (axis Z) of the work 1 and X-axis slides 41 and 41 movable in a direction perpendicular to the axis of the work 1 (axis X in a fore-and-aft direction in the drawing). Tool stands 32 and 32, which are attachably and detachably mounted with tools 31 and 31 each at an end side of the work 1 side in the X-axis direction, are provided at the side of the opposing surfaces of the two cutting tool drive units 30 and 30 in the Z-axis direction.

Figure 2:
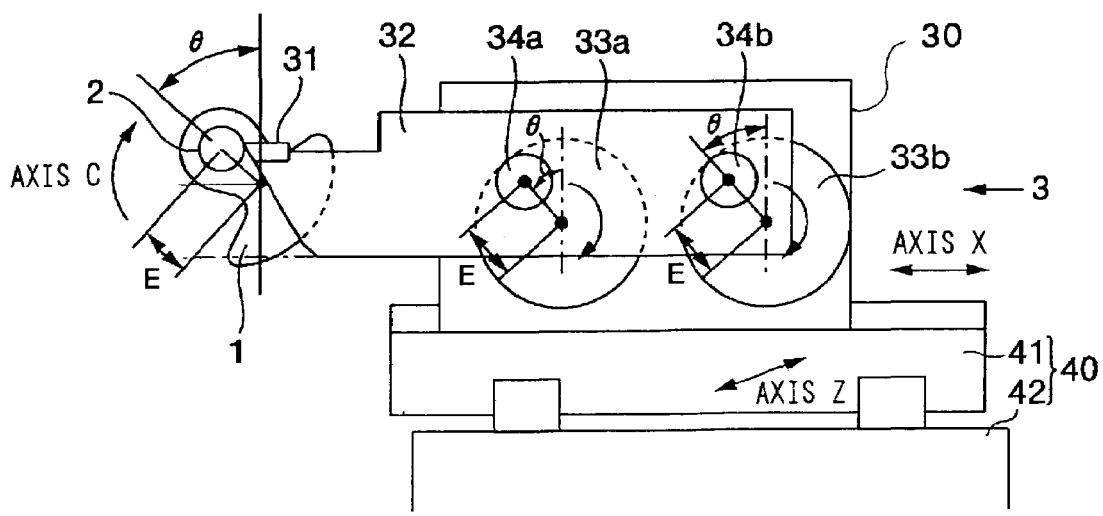
FIG. 2 is an explanatory view of a drive method of a cutting tool of a first embodiment of the present invention.
Figure 3:
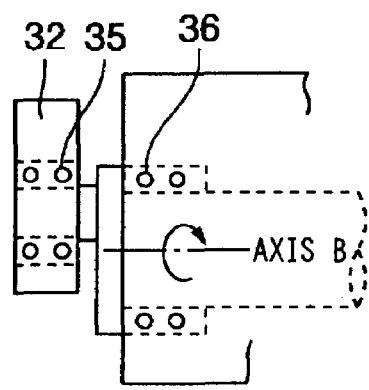
FIG. 3 is a schematic view seen in the arrow 3 of FIG. 2.
Figure 4:
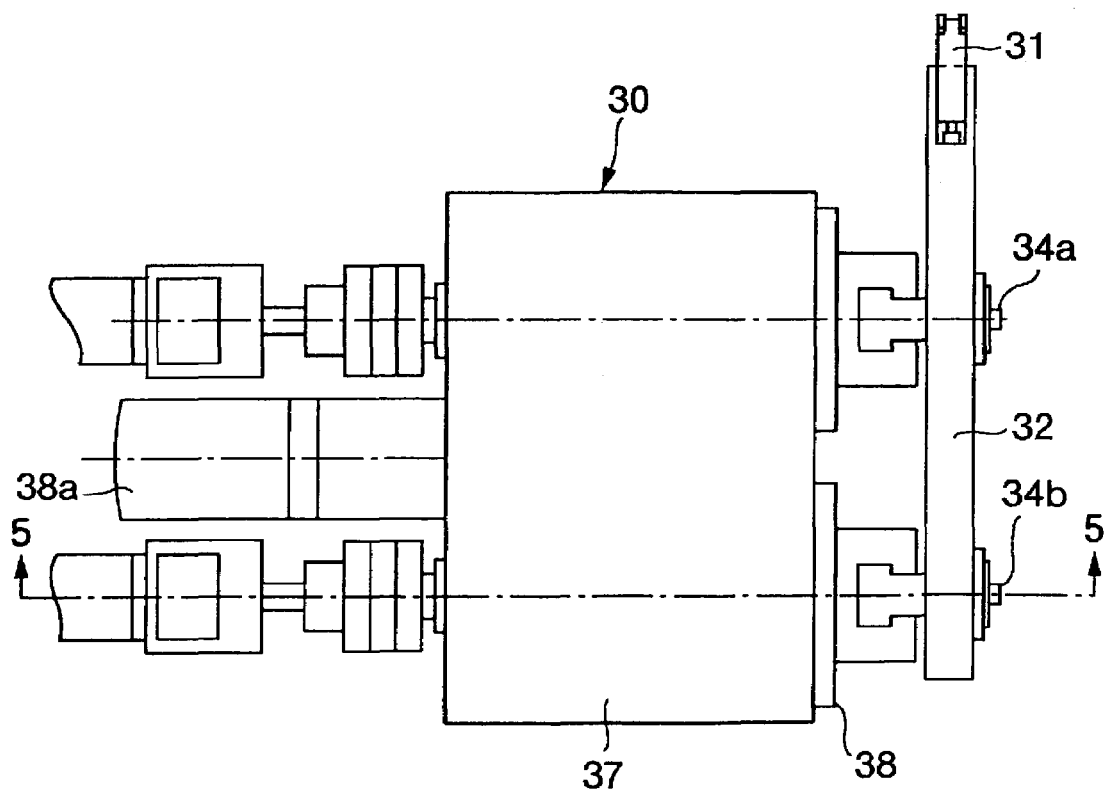
FIG. 4 is a plan view of a cutting tool drive unit of the first embodiment.
Figure 5:
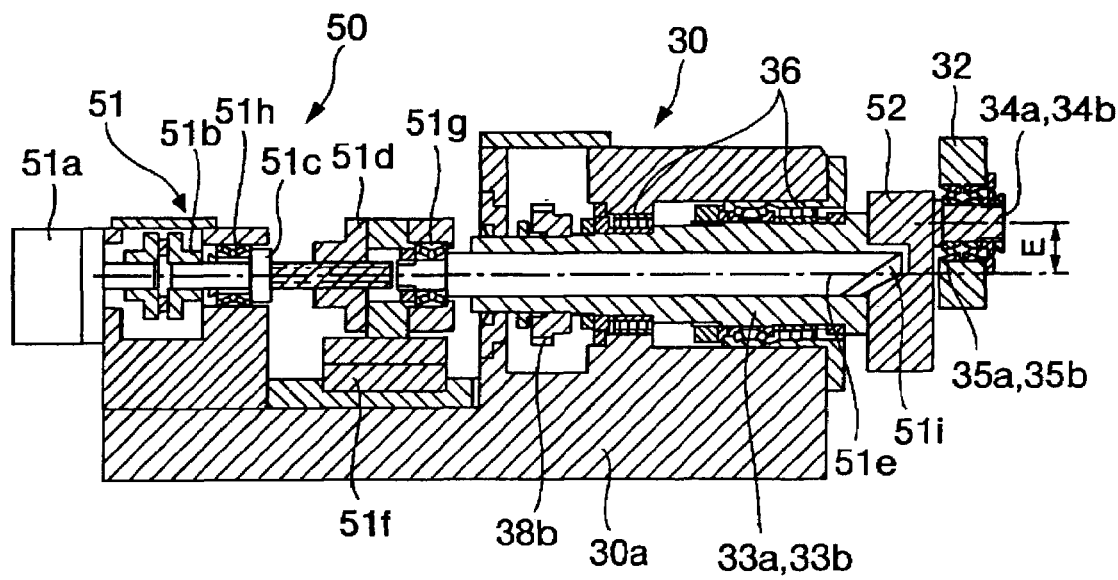
FIG. 5 is a sectional view taken along the line 5—5 in FIG. 4.

Next, The cutting tool drive units 30 and 30 of this embodiment will be explained based on FIG. 2 to FIG. 5. FIG. 2 is an explanatory view of a drive method of the cutting tool of this embodiment, and FIG. 3 is a schematic diagram seen in the arrow 3 in FIG. 2. FIG. 4 is a plan view showing the cutting tool drive unit of this embodiment, and FIG. 5 is a sectional view taken along the line 5—5 in FIG. 4, which shows eccentricity amount adjusting means of this embodiment. Since the two cutting tool drive units 30 and 30 at the left and right have the same constitution except for the point that they are symmetrical about the plane parallel with the axis X, only one of the cutting tool drive units 30 will be explained here.

As shown in FIG. 2 to FIG. 5, the cutting tool drive unit 30 includes two cutting tool drive main shafts 33a and 33b, which have axes (axis B) parallel with an axis C (axis of the work 1) and are rotatably supported at a main body base 30a via bearings 36, and eccentric pins 34a and 34b which are provided to protrude by an eccentricity amount E with each axis being in parallel with the C-axis direction, at end surfaces of the cutting tool drive main shafts 33a and 33b. Further, the cutting tool drive unit 30 includes the tool stand 32 which has the tool 31 at the side of the work 1, and has eccentric pin bearings 35a and 35b that are provided in a longitudinal direction at the opposite side from the tool 31 with the same space between them as the space between the axes of the cutting tool drive main shafts 33a and 33b to fit the eccentric pins 34a and 34b therein, a drive device 38 which makes them perform crank rotational drive, and eccentricity amount adjusting means 50.

The drive device 38 includes a drive motor 38a, a pinion gear (not shown) which is axially attached to the drive motor 38a inside a main shaft gear box 37, and gears 38b and 38b with the same number of teeth, which are meshed with the pinion gear and fixed to the cutting tool drive main shafts 33a and 33b. In this embodiment, the one drive motor 38a synchronously rotates two of the cutting tool drive main shafts 33a and 33b, but it goes without saying that the structure in which only one of the front and rear main shafts is driven and the other main shaft is made to follow it may be adopted.

The eccentricity amount adjusting means (eccentricity amount adjusting mechanism) 50 includes advancing and retreating means (advancing and retreating mechanism) 51 which is fitted onto center regions of the cutting tool drive main shafts 33a and 33b, and advances and retreats in its axial direction, and pin moving means (pin moving mechanism) 52 which converts a thrust force in an axial direction of the advancing and retreating means 51 in a direction perpendicular to the axis, that is, an eccentricity amount adjusting direction. The advancing and retreating means 51 includes an electric motor 51a attached to the main body base 30a, a screw 51c which is provided with a male thread on an outer circumference part at one end side and is rotatably supported at the part near the other end portion by the main body base 30a, via a bearing 51h to convert the rotational force of the electric motor 51a into the thrust force in the axial direction, and a coupling 51b which couples an output shaft of the electric motor 51a and the other end portion of the screw 51c. Further, the advancing and retreating means 51 includes a nut 51d screwed into the male thread of the screw 51c, an advancing and retreating bar 51e, which is fitted in the center region of the cutting tool driving main shaft 33a, provided with a wedge 51i at a tip end portion thereof to convert the thrust force in the axial direction of the screw 51c in the eccentricity amount adjusting direction to move the pin moving means 52, and is provided with a bearing 51g at its base end side, and a slide 51f which supports the nut 51d and the bearing 51g to make them able to advance and retreat in the axial direction with respect to the main body base 30a.

In the embodiment of the present invention, the electric motor 51a is used as an actuator which gives the thrust force in the axial direction of the advancing and retreating bar 51e, but this is not restrictive, and it may be replaced by a hydropneumatically operated actuator which rotates or swings the screw 51c with the axis C as the center. Alternatively, it is no problem to adopt a direct-acting hydropneumatically operated cylinder and give a thrust in an axial direction directly to the advancing and retreating bar. The eccentricity amount adjusting means of the first embodiment is the eccentricity amount adjusting means 50 which automatically adjust the eccentricity amount, but the constitution in which the setup change of the eccentricity amount is manually performed may be adopted.

In the crankshaft lathe-cutting machine which is the embodiment of the present invention, electric servo motors are adopted as the rotational drive motors 23 and 23 for the work 1, and the drive motors 38a and 38a for the tools 31 and 31, and a synchronous control device which synchronizes these rotations is provided. The synchronization of them is performed by electric control, but the present invention is not limited to this. For example, the method of connecting the rotational drive shaft for the work 1 and the cutting tool driving main shafts 33a and 33b which drive the tool 31 with gears, timing belts or the like, and mechanically synchronizing them may be adopted.

An operation of the crankshaft lathe-cutting machine according to the constitution of the first embodiment will be explained based on FIG. 1 to FIG. 5.

(1) First, before working the work 1, setting to automatically conform the respective eccentricity amounts of the two eccentric pins 34a and 34b of the tool stand 32 to a half stroke dimension (dimension E in FIG. 2) is performed by the eccentricity amount adjusting means 50 shown in FIG. 5 as the previous setting of the crankshaft working machine. This operation is performed as follows. Namely, based on a numeric value of a half stroke dimension which is set at an NC device (not shown) corresponding to each work 1, the electric motor 51a is rotated according to a predetermined operation command that is outputted from this NC device to rotate the screw 51c. The rotational force of the electric motor 51a is converted into a thrust force in an axial direction, and the advancing and retreating bar 51e is advanced or retreated in its axial direction. The thrust force in the axial direction is then converted into the one in the eccentricity amount adjusting direction to move the pin moving means 52 by a predetermined amount by the wedge 51I at the tip end portion of the advancing and retreating bar 51e, and the eccentric pins 34a and 34b are moved in the eccentricity amount adjusting direction and positioned so that each eccentricity amount is the same dimension E.

In addition to the setting of the eccentricity amount adjusting means 50, as the other previous setting of the crankshaft working machine, the space between both the supporting devices 21 and 21 is conformed to the length of the work 1 by moving two of the rotational drive devices 20 and 20 along the rail 25. Further, in addition to the position setting of both the supporting devices 21 and 21, the auxiliary supporter 24, which is provided between both the supporting devices 21 and 21, is moved along the rail 25 and moved to a predetermined position of the main journal 3 in the vicinity of the center part of the work 1, whereby preparation for clamping with the auxiliary supporter claw 24b is made.

In the embodiment of the present invention, the eccentricity amount adjusting means 50 is enabled to adjust the eccentricity amount automatically according to the above-described constitution, and therefore in the crankshaft working line, working operation in which various crankshafts differing in the half stroke are fed at random becomes possible, thus making it possible to improve productivity of the crankshaft working line remarkably. Since the actuator which moves the eccentric pins 34a and 34b in the eccentricity adjusting direction is not provided in the crank driving system of the tool stand 32, but it is provided behind the cutting tool driving main shafts 33a and 33b, the weight of this actuator does not become a cause of unbalance during rotation of the tool stand 32, and therefore crank operation of the tool stand 32 can be performed very smoothly.

(2) Next, the work 1 to be worked is carried in between the supporting devices 21 and 21 at both sides, and the main journal portions at both ends of the work 1 are gripped with the respective chuck ternary claws 21b and 21b, and a rotational angle phase θ around the axis C (see FIG. 2) of the pin journal 2a is positioned at a predetermined phase with phase determining means (not shown). Then, the main journal 3 in the vicinity of substantially the center portion of the work 1 is gripped with the auxiliary supporter claw 24b of the auxiliary supporter 24, whereby auxiliary rest is performed, and flexural rigidity of the work 1 against the cutting load is enhanced.

Figure 9:
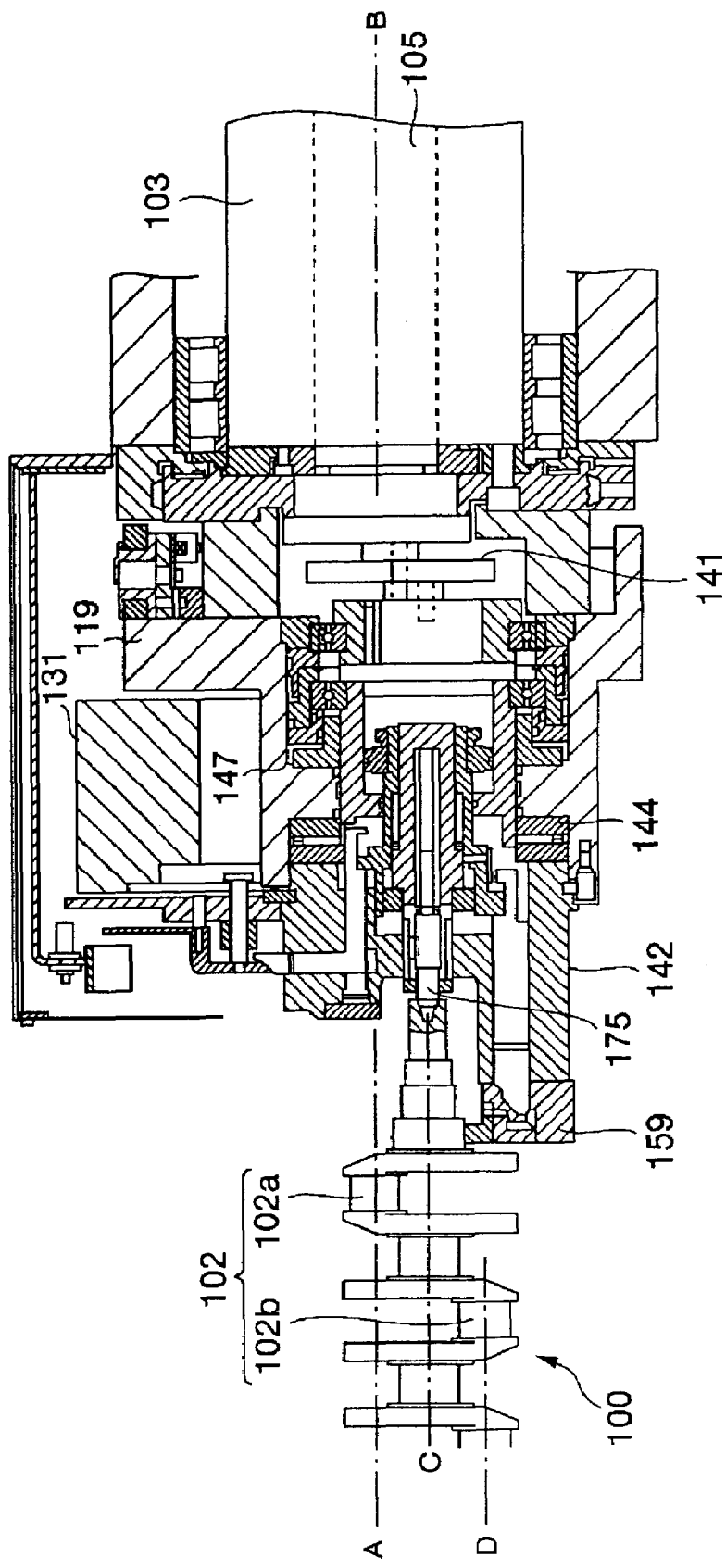
FIG. 9 is an explanatory view of a chuck device of a crankshaft lathe-cutting machine according to a prior art.

In the prior art, the crankshaft is rotated around a shaft center D (see FIG. 9) of the pin journal, and therefore no shaft portion sharing the center of rotation exists near the worked region, thus making it impossible to perform auxiliary support (rest). However, in the present invention, the work 1 is rotated around the axis C of the main journal 3, thus making it possible to grip the main journal 3 in the vicinity of the center portion of the work 1 and perform auxiliary support (rest). Consequently, heavy cut becomes possible, and favorable finishing work accuracy can be obtained.

(3) Subsequently, the lathe-cutting process of the work 1 is started, and the operation mechanism of the machine is explained based on FIG. 2 and FIG. 3. In FIG. 2, the work 1 is rotated with the main journal 3 as the center axis (axis C) by the rotational drive motor 23, and the eccentric part 2 (pin journal 2a) of the work 1 that is the object to be worked is rotated around the axis C as its center with its center being away from the axis C by an eccentricity amount E. On the other hand, in the cutting tool drive unit 30, two of the cutting tool driving main shafts 33a and 33b having the axes (axis B) parallel with the direction of the axis C are rotated synchronously with the rotation of the work 1 by the drive motor 38a via the pinion gear (not shown) and the gears 38b and 38b with the same number of teeth which are meshed with the pinion gear, and fixed to the cutting tool driving main shafts 33a and 33b. Consequently, the tool stand 32 having the eccentric pin bearings 35a and 35b, which are provided with the same space between them as the space between the axes of the cutting tool driving main shafts 33a and 33b, is made to perform crank rotation synchronously with the crank rotation of the pin journal 2a (corresponding to the eccentric part 2) via the eccentric pins 34a and 34b fitted in the eccentric pin bearings 35a and 35b, which are provided at the end surfaces of the cutting tool driving main shafts 33a and 33b with each of the axes parallel with the C-axis direction and protruded by the same eccentricity amount E.

Accordingly, the tool stand 32 can perform the same crank rotation as the crank rotation of the pin journal 2a of the work 1, and therefore the locus of the cutting edge position of the tool 31 can perform a crank movement with a radius E. As the initial setting of the machine, the rotational angle θ of the cutting tool driving main shafts 33a and 33b and the rotational angle θ of the work 1 are both set at zero, and the height h of the cutting edge is set at the height of the center axis of the pin journal 2a. The cutting tool driving main shafts 33a and 33b are synchronously rotated (angle θ) correspondingly to the rotation (angle θ) of the pin journal 2a, whereby the locus of the cutting edge position of the tool 31 can create an outer diameter part of the pin journal 2a. As known from FIG. 2, the outer diameter of the pin journal 2a is determined by the length of the approach distance of the cutting edge position to the work 1 in the X-axis direction, and the distance between the center of the eccentric part 2 of the work 1 and the cutting edge position of the tool 31 becomes the radius of the outer diameter of the pin journal 2a.

As described above, according to the constitution of the tool drive of the present invention, the following unique effects can be obtained.

Since the crankshaft is rotated around the axis of the main journal, rotation unbalance amount of the crankshaft itself does not exist. In the prior art, from the necessity of performing half stroke conversion, pin journal phase indexing, cancel of unbalance amount and the like inside the chuck, the structure of the chuck is extremely complicated, but the chuck of the present invention has an extremely simple structure, and thereby occurrence of an unbalance amount during rotation can be also extremely reduced in the chuck. Accordingly, as compared with the prior art which is rotated around the pin journal axis, the present invention is less influenced by the rotation unbalance during working, and harmful work displacement during rotation, and occurrence of vibrations and the like in the work or the machine system are prevented, thus making it possible to obtain more excellent accuracy of finishing.

Further, in the prior art, the structure of the chuck is extremely complicated, and therefore the cost is high. However, in the present invention, it is not necessary to perform half stroke conversion, pin journal phase indexing, automatic cancel of the unbalance amount, and the like in the chuck, and therefore the structure of the chuck is extremely simplified, thus making it possible to reduce the production cost. The chuck does not need to have the functions except the clamp function, and has smaller number of components such as hydraulic actuators included therein, and thus the structure is very simple. Accordingly, the problem is extremely reduced in failure, useful life and the like, and in addition, only a small number of conduit lines to supply oil to the hydraulic actuator is needed, thus the number of hydraulically rotated joints is small, and the fear of oil leakage from the seal regions is eliminated.

In addition to the above-described effects, crank rotation movement of the cutting edge position can be accurately performed with a simple constitution with the tool 31, two of the cutting tool driving main shafts 33a and 33b provided in parallel with the axial direction of the crankshaft, the eccentric pins 34a and 34b which are attached to end surfaces of the cutting tool driving main shafts 33a and 33b with the same eccentricity amount, and the tool stand 32 which is rotatably attached to the eccentric pins 34a and 34b and mounted with the tool 31 at its tip end portion.

Next, lathe-cutting of the pin journal part will be explained. The lathe-cutting is performed by moving the Z-axis slide 42 to position the tool 31 in a predetermined position in the longitudinal direction of the pin journal 2a which is the object to be worked, and thereafter, by driving the cutting tool drive unit 30 to synchronize the position of a tool cutting edge 31a with the rotation of the pin journal 2a around the axis C of the crankshaft and make it perform crank rotation. Then, in the state in which the position of the tool cutting edge 31a performs crank rotation, the X-axis slide 41 is moved to move the tool 31 close to and away from the pin journal 2a in the radial direction thereof, and the Z-axis slide 42 is moved to move the tool 31 in the axial direction of the pin journal 2a, thereby performing lathe-cutting to make the pin journal 2a have a predetermined outer diameter shape.

Figure 6:
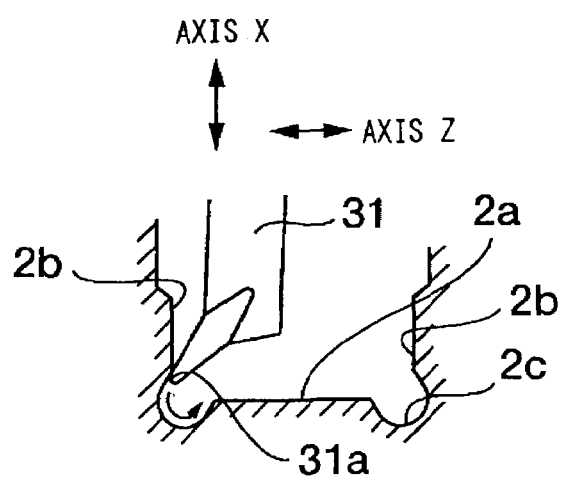
FIG. 6 is an explanatory view of working of an undercut R groove shape according to the present invention.

FIG. 6 is an explanatory view of undercut R groove shape working of the crankshaft according to the present invention. The explanation will be made with the case in which, for example, the pin journal 2a is lathe-cut into an outer diameter shape as shown in FIG. 6, namely, an outer diameter shape having undercut R grooves 2c recessed in the axial direction of the pin journal 2a and pin journal thrust 2b at both left and right sides of the pin journal 2a. In this case, in the state in which the tool cutting edge 31a provided at any one of left and right cutting tool drive unit 30 is synchronized with the rotation of the pin journal 2a with the axis C of the crankshaft as the center to make it perform the crank rotation, the Z-axis position of the tool cutting edge 31a is matched to the pin journal thrust 2b at the left side in FIG. 6. Thereafter, the tool cutting edge 31a is advanced to the pin journal 2a side in the X-axis direction, and working of the pin journal thrust 2b is performed. Next, after the working of the pin journal thrust 2b, the tool cutting edge 31a is moved by synchronous control (circular interpolation) of the axis X and the axis Z, and the undercut R groove 2c at the left side of FIG. 6 is lathe-cut in a predetermined worked shape.

Subsequently, the case in which the pin journal thrust 2b and the undercut R groove 2c at the right side in the drawing are lathe-cut into predetermined worked shapes will be explained. In this case, with use of the tool cutting edge 31a provided at the opposite cutting tool drive unit 30 from the tool drive unit 30 used in the above, the position of the tool cutting edge 31a may be controlled based on the above-described working method to perform the lathe-cutting. In the above description, the example in which the undercut R groove 2c is worked with the pin journal thrust 2b is shown, this is also applicable to the case in which only the undercut R groove 2c is worked.

According to the above-described working method of the present invention, the following effects can be obtained. In the present invention, the cutting tool drive units are constituted to be movable in the axial direction (Z-axis direction) of the crankshaft. Consequently, working that cannot be performed with the conventional crankshaft miller, namely, grinding undercut working in a corner portion, at which the shoulder surface (side surface) and the shaft outer diameter surface of the eccentric part (pin journal portion) of the crankshaft are intersecting, or working of R grooves recessed (undercut) in the axial direction, which is required as pre-working of deep roll, can be facilitated.

Figure 7:
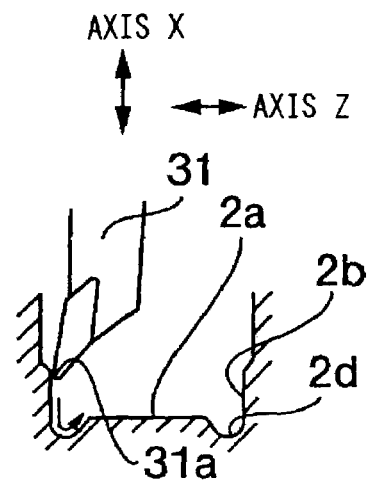
FIG. 7 is an explanatory view of working of an optional shape of a crankshaft R groove according to the present invention.

FIG. 7 is an explanatory view of working of the crankshaft R groove in an optional shape according to the present invention. As shown in FIG. 7, the pin journal 2a is lathe-cut to have the outer diameter shape constituted by the R grooves without undercut and the pin journal thrusts 2b in some case, and in this case, lathe-cutting can be also performed in the same manner as the working example shown in FIG. 6.

Figure 8:
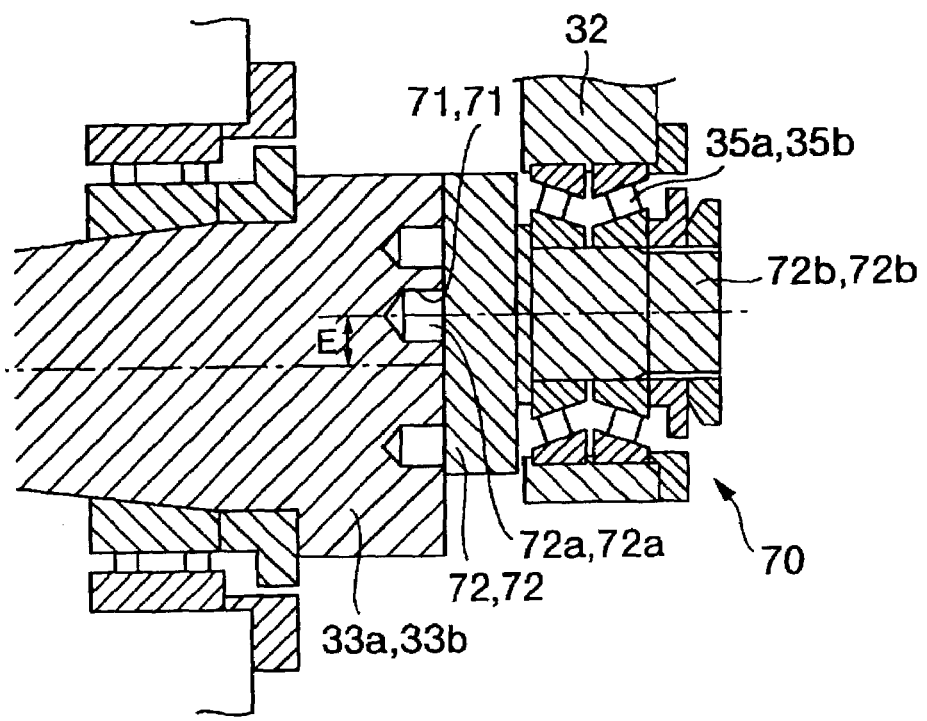
FIG. 8 is a sectional view of eccentricity amount adjusting means of a second embodiment of the present invention.

Next, as eccentricity amount adjusting means of a second embodiment, eccentricity amount changing means 70 which manually performs setup change of the eccentricity amount will be explained based on FIG. 8. FIG. 8 is a sectional view of the eccentricity amount adjusting means of this embodiment. In FIG. 8, the same components as the components in the first embodiment are given the same reference numerals and symbols.

The eccentricity amount changing means 70 includes a plurality of pin holes 71 and pin supporting means 72 and 72, which are for positioning, on end surfaces of the cutting tool driving main shafts 33a and 33b, and the tool stand 32. A plurality of pin holes 71 are provided with a distance between a center of the cutting tool driving main shafts 33a and 33b and a center of the pin holes 71 being conformed to a half stroke dimension (E) of various works 1. The pin supporting means 72 and 72 are provided with pins 72a which are fitted in a plurality of pin holes 71 at one end side, and is provided with eccentric pins 72b having the same centers as the axes of the pins 72a at the other end side. The tool stand 32 is mounted with the tool 31 at the tip end portion, and is provided with two eccentric pin bearings 35a and 35b, which have the same space between them as the space between the axes of the both cutting tool driving main shafts 33a and 33b and are for fitting the eccentric pins 72b. As described above, the eccentric amount changing means 70 has the constitution in which setting of the position of the eccentric pin 72b is performed manually, and therefore the structure of this apparatus is simplified and compact, and can be produced at low cost.

As described thus far, according to the present invention, the following effects are provided.

(1) According to the present invention, the crankshaft is rotated around the axis of the main journal, and therefore it goes without saying that rotation unbalance amount of the crankshaft itself does not exist. In addition, the chuck, which supports the main journal, has the simple structure, and therefore occurrence of the unbalance amount during rotation can be also extremely decreased in the chuck. Accordingly, it is hardly influenced by the rotation unbalance during working, and harmful work displacement during rotation, and occurrence of vibrations or the like of the work or the machine system are eliminated, thus making it possible to obtain extremely favorable working accuracy. Further, rotation is performed with the main journal axis as the center, whereby the rotation center is shared, and auxiliary support (rest) of any one of main journal outer diameter portions located in the vicinity of the longitudinal center of the work can be performed, and therefore heavy cutting can be made, or favorable finishing work accuracy can be expected.

Since it is not necessary to perform half stroke conversion, pin journal phase indexing, automatic cancel of an unbalance amount and the like in the chuck, the structure of the chuck is extremely simplified, and the production cost can be made low. The chuck does not need the functions other than the clamp function, and has the very simple structure with the small number of components such as the hydraulic actuators incorporated therein, thus having very few problems in a failure, useful life and the like. In addition, only the small number of conduit lines to supply oil to the hydraulic actuator are needed, and therefore the number of hydraulic rotation joints is small, and the fear of oil leakage from the seal regions is eliminated.

(2) Crank rotation movement of the cutting edge position can be accurately performed with the simple constitution with the tool, two of the cutting tool driving main shafts which are provided in parallel with the axial direction of the crankshaft, the eccentric pin which is attached to the end surface of each of the cutting tool driving main shafts with the same eccentricity amount, and the tool stand, which is rotatably attached to each of the eccentric pins and mounted with the aforementioned tool.

(3) Since the cutting tool drive unit is constituted to be movable in at least any one direction of the axial direction of the work (Z-axis direction) and the direction perpendicular to the axis (X-axis direction), grinding undercut working in the corner portion at which the shoulder surface of the eccentric part of the crankshaft and the shaft outer diameter surface are intersecting, or working of the R groove recessed in the axial direction, which is required as the pre-working of the deep roll can be facilitated.

(4) By providing the eccentricity amount adjusting means, the eccentricity amount from the cutting edge position of the tool to the cutting tool drive main shaft center of the cutting tool drive unit can be set correspondingly to half stroke of the crankshaft, and working of various crankshafts differing in the half stroke can be easily worked. This eccentricity amount adjusting means is made automatic type by the advancing and retreating means moved in the axial direction with the actuator, and the pin moving means which converts the axial direction thrust force into the direction perpendicular to the axis, at the end surface side of the cutting tool drive main shafts, to move the eccentric pins in the eccentricity amount adjusting direction. Accordingly, in the crankshaft working line, working operation by feeding various kinds of crankshafts differing in the half stroke at random is made possible, and therefore productivity of the working line can be improved.

Further, the actuator which moves the eccentric pins is provided behind the cutting tool driving main shafts instead of providing it in the crank driving system of the tool stand, and therefore the weight of this actuator does not become a factor of the rotation unbalance, thus making it possible to perform crank movement of the tool stand smoothly. Further, if the eccentricity amount adjusting means is constituted so that the setting of the eccentric pin position is performed manually, the structure of this lathe-cutting apparatus becomes simple and compact, and the lathe-cutting apparatus can be produced at low cost.

What is claimed is:

1. A lathe-cutting apparatus which performs lathe-cutting of an eccentric part of a crankshaft, said lathe-cutting apparatus comprising:
   a pair of supporting devices, each of which supports an end portion of the crankshaft;
   at least one rotational drive device which is provided at an end side of at least one of the pair of supporting devices, and which rotates the crankshaft around a main journal thereof so as to rotate the eccentric part;
   a tool which performs the lathe-cutting of the eccentric part; and
   a cutting tool drive unit which eccentrically rotates a cutting edge position of the tool synchronously with the rotation of the eccentric part;
   wherein the cutting tool drive unit is movable in an axial direction of the crankshaft and in a direction perpendicular to the axial direction while eccentrically rotating said cutting edge position of the tool.

2. A lathe-cutting apparatus which performs lathe-cutting of an eccentric part of a crankshaft, said lathe-cutting apparatus comprising:
   a pair of supporting devices, each of which supports an end portion of the crankshaft;
   at least one rotational drive device which is provided at an end side of at least one of the pair of supporting devices, and which rotates the crankshaft around a main journal thereof so as to rotate the eccentric part;
   a tool which performs the lathe-cutting of the eccentric part; and
   a cutting tool drive unit which eccentrically rotates a cutting edge position of the tool synchronously with the rotation of the eccentric part, said cutting tool drive unit comprising:
      two cutting tool driving main shafts each having an axis parallel with an axial direction of the crankshaft;
      two eccentric pins, each of which protrudes from an end surface of a corresponding one of the cutting tool driving main shafts, wherein each of the eccentric pins is offset from an axis of the corresponding main shaft by a same eccentricity amount, and wherein a distance between the eccentric pins is equal to a distance between the axes of the main shafts;
      a tool stand which includes the tool at a tip end portion thereof, and two eccentric pin bearings for fitting the eccentric pins;
      a driving device which rotationally drives at least one of the two cutting tool driving main shafts; and
      wherein the cutting tool driving unit is movable in an axial direction of the crankshaft and in a direction perpendicular to the axial direction while eccentrically rotating the cutting edge position of the tool.

3. The lathe-cutting apparatus according to claim 2, further comprising an eccentricity amount adjusting mechanism which automatically sets the eccentricity amount by conforming the eccentricity amount to a half stroke of the crankshaft.

4. The lathe-cutting apparatus according to claim 3, wherein the eccentricity amount adjusting mechanism comprises:
   an advancing and retreating mechanism which is moved in an axial direction thereof by an actuator provided behind the cutting tool driving main shafts; and
   a pin moving mechanism which converts a thrust force in the axial direction of the advancing and retreating mechanism into a thrust in a direction perpendicular to the axial direction of the advancing and retreating mechanism at a side of the end surfaces of the cutting tool driving main shafts so as to move the eccentric pins in an eccentricity amount adjusting direction.

* * * * *